(12) United States Patent
Stewart et al.

(10) Patent No.: US 9,183,416 B2
(45) Date of Patent: Nov. 10, 2015

(54) SYSTEM FOR PERFORMING PARALLEL FORENSIC ANALYSIS OF ELECTRONIC DATA AND METHOD THEREFOR (75) Inventors: Jon Stewart, Arlington, VA (US); Geoffrey N. Black, New York, NY (US)

(73) Assignee: Lightbox Technologies, Inc., Arlington, VA (US)

( * ) Notice: Subject to any disclaimer, the term of this patent is extended or adjusted under 35 U.S.C. 154(b) by 0 days.

(21) Appl. No.: 13/077,235

(22) Filed: Mar. 31, 2011

(65) Prior Publication Data

US 2012/0254203 A1 Oct. 4, 2012

(51) Int. Cl.
G06F 7/00 (2006.01)
G06F 21/80 (2013.01)
G06F 17/30 (2006.01)
G06F 21/62 (2013.01)

(52) U.S. Cl.
CPC ........ *G06F 21/805* (2013.01); *G06F 17/30156* (2013.01); *G06F 21/6209* (2013.01); *G06F 21/80* (2013.01); *G06F 2221/2101* (2013.01)

(58) Field of Classification Search
CPC ................................................ G06F 17/30156
USPC .......................................................... 707/667
See application file for complete search history.

(56) References Cited

U.S. PATENT DOCUMENTS

2007/0247525 A1* 10/2007 Samarasekera et al. ...... 348/159
2010/0098250 A1*  4/2010 Schultz et al. ................ 380/200
2012/0209983 A1*  8/2012 Bronner et al. ............... 709/224

* cited by examiner

*Primary Examiner* — Ajith Jacob
(74) *Attorney, Agent, or Firm* — Schwegman Lundberg & Woessner, P.A.

(57) ABSTRACT

System and method for conducting a forensic analysis of electronic data having files and information indicative of a location of each of the files. The system has processors and a controller. The controller is configured to characterize the electronic data based, at least in part, on the files and the information indicative of the location of each of the files to obtain a characterization and distribute segments of the electronic data to the processors based, at least in part, on the characterization, each of the processors corresponding to at least one of the segments and each of the segments corresponding to at least one of the processors. Each one of the processors is configured to process each corresponding one of the segments to identify at least one characteristic of each corresponding one of the segments.

20 Claims, 4 Drawing Sheets

Figure 4 ions to reduce the total analysis time. In such embodiments, the subject data to be analyzed is broken up into parts and distributed to multiple processors. Each processor, acting independently, then analyzes its part and provides a report. Cer-

SYSTEM FOR PERFORMING PARALLEL FORENSIC ANALYSIS OF ELECTRONIC DATA AND METHOD THEREFOR

FIELD

The present disclosure relates generally to the field of data forensics and, more specifically, to identifying a characteristic in large amounts of data using multiple processors.

BACKGROUND

The field of data forensics is concerned with the analysis of data obtained from third-party sources. For instance, a law enforcement agency may take possession of a computer hard drive and desire to know the contents. An intelligence agency may collect large amounts of data from one or more electronic sources and may need the information reduced to a searchable format. More prosaically, a company may store large archives of data which are not typically accessed, or a computer hard drive may be damaged in some way, resulting in a need to recover the stored data.

In computer forensics, investigators may need to consider every byte of data of a set of electronic data or "evidence file", such as a copy of a hard drive (known in the art as a "disk image") or other digital storage media, and treat this data with intensive process, such as looking for known contraband, highlighting images of child pornography and counterfeit currency, recovering internet web surfing history, searching for keywords related to the investigation, and other processes. Common, therefore, among applications of data forensics is the desire to turn a relatively large amount of potentially disjointed and fragmented electronic data into a useful format for a subsequent analysis.

Traditionally, data forensics has proceeded by sequentially stepping through the data on which the analysis is being performed using a processor. Inherent in the need to perform a forensic analysis in the first place is the reality that the data is not understood prior to conducting the forensic analysis. Consequently, a computer hard drive with fragmented data may still be entirely useful, since the location of the various fragments of the files are known, as well as other information about the files known in the art as "metadata", including file and folder names, associated timestamps, and other fields related to their use. However, when a forensic analysis is needed, many investigative processes may either desire or require the examination of all data sectors of the storage media, regardless of whether they are associated with extant files.

Moreover, the analysis processes are typically not combined and therefore necessitate several passes over the data. However, even if they were combined so that only a single read of the data was necessary, the amount of computation required usually results in total throughput being considerably less than the sustained transfer rate of the disk. For example, although a disk could be read at one hundred (100) megabytes per second, it's quite possible that a keyword search could result in only one (1) megabyte per second of throughput. Searching a one (1) terabyte disk at that rate would require over twelve (12) days of processing time.

It is known in various forms of data computation and analysis, such as searching algorithms, to utilize parallel processing to reduce the total analysis time. In such embodiments, the subject data to be analyzed is broken up into parts and distributed to multiple processors. Each processor, acting independently, then analyzes its part and provides a report. Certain applications, such as those related to Internet searching functions, utilize many thousands of processors in parallel to analyze data.

However, the field of data forensics has long proven unable to incorporate parallel processing in the way that Internet searching has been able to do. While forensics requires a high degree of precision in order to fully analyze the relevant data, Internet searching, for instance, does not require a highly precise understanding of the entire Internet; users of an Internet search engine will not be massively inconvenienced if the occasional website is missed in an analysis of the Internet. Furthermore, the files which are the subject of a forensic analysis may be several gigabytes or more, while a typical website may be a few megabytes or less. Finally, the data to be analyzed forensically may vary widely in format and kind and may be fragmented or corrupted compared to traditional data processing applications, which may tend to consider structured or semi-structured records in limited formats, such as html files on websites, financial transactions in a database, and the like.

SUMMARY

Consequently, the act of breaking data into segments for parallel processing has, in data forensics, tended to result in individual files in the data being broken up among the various segments. In so doing, the files may not be properly analyzed for content; if the beginning of a file is in a first segment and the end of a file is in a second segment, and each segment is sent to a different processor, neither processor may be able to determine what is in the file. Moreover, a file may be fragmented in unordered, nonsequential ranges of sectors across the disk image. When segmentation happens at an Internet search engine, the website which makes up the file may simply not be analyzed at that time which, owing to the scope of the Internet, may be at worst an inconvenience. Alternatively, special handling may occur to read the remaining data in the file from the next segment, as it may be believed not to be otherwise fragmented. By contrast, the failure to analyze a file in a forensic analysis may result in critical data being missed.

Moreover, because such files in data forensics tend to be relatively few but large, the likelihood of a file being broken up between segments is relatively high.

The challenges of applying parallel processing to data forensics has been addressed through characterizing the data prior to processing the data. Rather than simply dividing the data into segments and distributing the segments to processors, the data is instead characterized and distributed to the processors on the basis of the characterization. In various forms, the data may be characterized to identify the locations of the files and create the segments for analysis on the basis of the characterization. As a result, derivative or secondary segments may be created which incorporate complete files, rather than fragments of files. In this way, each processor may be assigned a segment with the understanding that each file in the segment is complete.

In various cases, the location and manner in which the characterization occurs may vary. When the structure of the data is either well understood or is capable of being well understood, such as when the file system data of a storage media is known or the data is collected by an intelligence agency in a known method, the characterization may be performed by a central controller and the segments distributed to the processors properly formatted for analysis in the first instance. However, in cases where the structure of the data is not well understood, for instance, where the file system data of a hard drive is unavailable, the data may be first broken into segments and distributed to each processor, which may then relatively quickly characterize its own segment for file structure. On the basis of the characterization from each processor, a controller may rearrange the segments so that each processor has complete files for subsequent in-depth forensic analysis.

In an embodiment, a system for conducting a forensic analysis of electronic data comprising a plurality of files and information indicative of a location of each of the plurality of files comprises a plurality of processors and a controller operatively coupled to the plurality of processors. The controller is configured to characterize the electronic data based, at least in part, on the plurality of files and the information indicative of the location of each of the plurality of files to obtain a characterization and distribute a plurality of segments of the electronic data to the plurality of processors based, at least in part, on the characterization, each of the plurality of processors corresponding to at least one of the plurality of segments and each of the plurality of segments corresponding to at least one of the plurality of processors. Each one of the plurality of processors is configured to process each corresponding one of the plurality of segments to identify at least one characteristic of each corresponding one of the plurality of segments.

In an embodiment, the controller is further configured to create a work process for the plurality of segments of the electronic data based, at least in part, on the characterization, and the controller is further configured to distribute the plurality of segments of the electronic data to the plurality of processors based, at least in part, on the work process.

In an embodiment, the plurality of segments account for all of the electronic data.

In an embodiment, the controller is further configured to distribute the plurality of segments so that each individual one of the plurality of files is wholly contained in at least one of the plurality of segments.

In an embodiment, the characteristic identified for each corresponding one of the plurality of segments comprises information pertaining to at least one of the plurality of files corresponding to the corresponding one of the plurality of segments.

In an embodiment, the information comprises contents of the at least one of the plurality of files.

In an embodiment, the information indicative of a location of each of the plurality of files is file system data, and wherein the controller is further configured to characterize the electronic data based, at least in part, on the file system data.

In an embodiment, the plurality of segments is a second plurality of segments, and the electronic data is initially divided into a first plurality of segments, each individual one of the first plurality of segments being approximately equal in size and comprising at least a portion of at least one of said plurality of files. The controller is further configured to characterize the electronic data to obtain the characterization by identifying, for at least some of the plurality of files, segments of the first plurality of segments to which each one of the at least some of the plurality of files correspond. The controller is further configured to divide the electronic data into the second plurality of segments based, at least in part, on the characterization, at least some of the second plurality of segments being of different size and comprising at least a portion of at least one of the plurality of files.

In an embodiment, each of the plurality of files has a file start and the controller is further configured to divide the electronic data into the second plurality of segments based, at least in part, on a location in one of the first plurality of segments of each file start of the plurality of files.

In an embodiment, each individual one of the plurality of files has a correspondence in primary part to one of the first plurality of segments and the controller is further configured to divide the electronic data into the second plurality of segments based, at least in part, on the correspondence in primary part of each individual one of the plurality of files.

In an embodiment, a method for conducting a forensic analysis of electronic data comprising a plurality of files and information indicative of a location of each of the plurality of files comprises the steps of characterizing the electronic data based, at least in part, on the plurality of files and the information indicative of the location of each of the plurality of files to obtain a characterization, distributing a plurality of segments of the electronic data to the plurality of processors based, at least in part, on the characterization, each of the plurality of processors corresponding to at least one of the plurality of segments and each of the plurality of segments corresponding to at least one of the plurality of processors and processing with the plurality of processors each corresponding one of the plurality of segments to identify at least one characteristic of each corresponding one of the plurality of segments.

In an embodiment, the method further comprising the steps of creating a work process for each of the plurality of segments of the electronic data based, at least in part, on the characterization and distributing step the plurality of segments of the electronic data to the plurality of processors based, at least in part, on the work process.

In an embodiment, the dividing steps further comprises dividing all of the electronic data into the plurality of segments.

In an embodiment, the distributing step further comprises distributing the electronic data so that each individual one of the plurality of files is wholly contained in at least one of the plurality of segments.

In an embodiment, the characteristic identified for each corresponding one of the plurality of segments comprises information pertaining to at least one of the plurality of files corresponding to the corresponding one of the plurality of segments.

In an embodiment, the information comprises contents of the at least one of the plurality of files.

In an embodiment, the information indicative of a location of each of the plurality of files is file system data, and the characterizing step further comprises characterizing the electronic data based, at least in part, on the file system data.

In an embodiment, the plurality of segments is a second plurality of segments, and the method further comprises initially dividing the electronic data into a first plurality of segments, each individual one of the first plurality of segments being approximately equal in size and comprising at least a portion of at least one of said plurality of files, characterizing the electronic data to obtain the characterization by identifying, for at least some of the plurality of files, segments of the first plurality of segments to which each one of the at least some of the plurality of files corresponds, and dividing the electronic data into the second plurality of segments based, at least in part, on the characterization, at least some of the second plurality of segments being of different size and comprising at least a portion of at least one of the plurality of files.

In an embodiment, each of the plurality of files has a file start, and the dividing step further comprises dividing the electronic data into the second plurality of segments based, at least in part, on a location in one of the first plurality of segments of each file start of the plurality of files.

In an embodiment, each individual one of the plurality of files has a correspondence in primary part to one of the first plurality of segments, and the dividing step further comprises dividing the electronic data into the second plurality of segments based, at least in part, on the correspondence in primary part of each individual one of the plurality of files.

DETAILED DESCRIPTION

Data forensics provides an analysis of electronic data to allow the electronic data to be searched and understood. Because of the large amounts of electronic data typically involved in a forensic analysis, parallel processing may substantially reduce the time required to perform the analysis. However, the nature of data forensics has, in the past, made the use of parallel processing impractical. By characterizing the data before analyzing the data, parallel processing may be made practical for data forensics.

Figure 1:
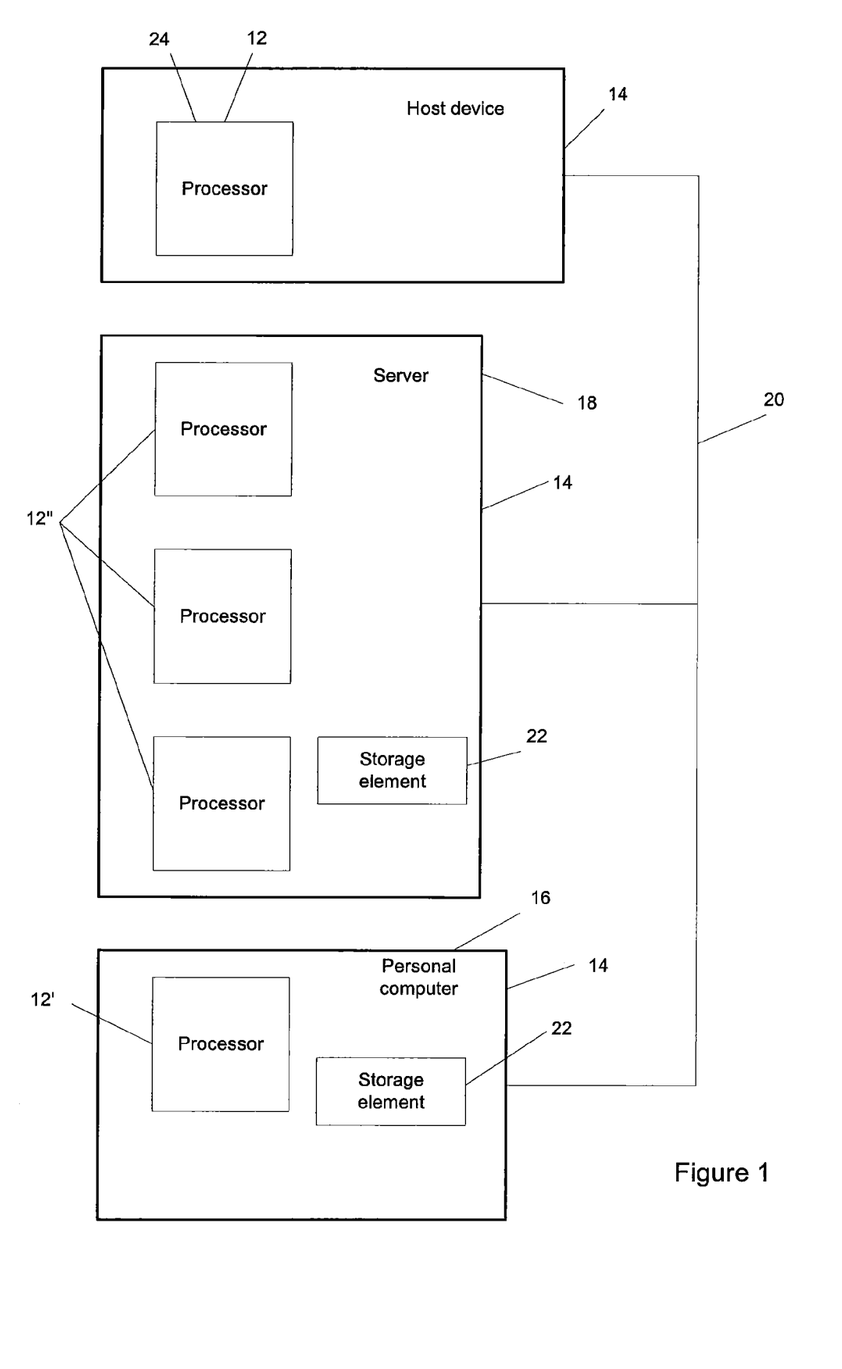
FIG. 1 is a system for determining a characteristic of electronic data.

FIG. 1 is a system 10 for performing a forensic analysis to determine a characteristic of electronic data. Processors 12 are electronic microprocessors or other electronic processing hardware well known in the art. Such processors 12 are, in various embodiments, standard, off-the-shelf components such as those found in commercially available computers and servers, or are custom designed and proprietary components. In various embodiments, processors 12 either incorporate the same specifications or vary with respect to specifications. As illustrated, processors 12 are components of various host devices 14, with processor 12' being a microprocessor in personal computer 16 and processors 12" being processors in server 18. The disposition of processors 12 in FIG. 1, however, is merely illustrative, and processors 12 may be disposed in any of myriad configurations and as components of a variety of host devices 14. In an embodiment, processors 12 are all disposed in computers 16.

As illustrated, host devices 14 are coupled together via network 20, which is variably conventionally wired, wireless or both, as well known in the art. In an alternative embodiment in which all of processors 12 are located within a single host device 14, network 20 may not be incorporated. Some of host devices 14 incorporate storage elements 22 operatively coupled to one or more processors 12, such as a hard drive. In an embodiment, one of storage elements 22 is a hard drive from which the electronic data to be subjected to forensic analysis is obtained. In various embodiments, where one processor 12 is a component of the same host device 14 which incorporates a storage element 22, processor 12 may obtain electronic data for processing from the local storage element 22. Processors 12 which are not components of a host device 14 which incorporates a storage element 22 may obtain electronic data from network 20. Additionally, in various embodiments, processors 12 may obtain electronic data from network 20 even if processor 12 has a local storage element 22.

In an embodiment, one of processors 12 functions as system controller 24. In such embodiments, controller 24 acts to control and coordinate various activities of system 10, as will be described in detail below, while also functioning as a processor 12 when not dedicated wholly to system control activities. Alternatively, controller 24 is a separate component which either does not incorporate processing functions as possessed by processors 12, or does not use such processing functions for the purposes to which processors 12 are utilized, as described below.

Figure 2:
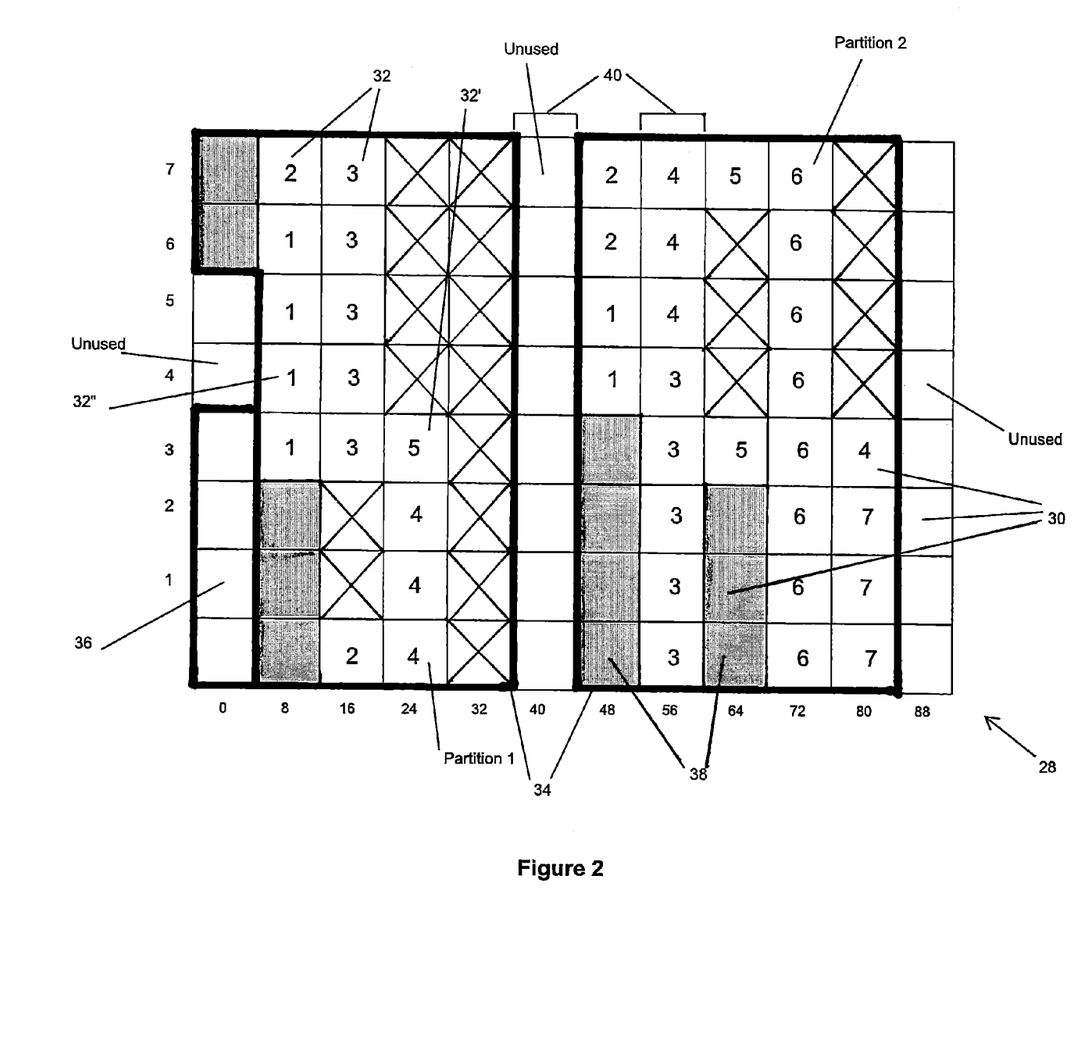
FIG. 2 is a simplified depiction of electronic data.

FIG. 2 is a simplified, block-diagram depiction of electronic data 28. In various embodiments, electronic data 28 takes many forms, including data collected from sensors and other instruments, among other sources. In addition, electronic data 28 may be collected from a single storage device or may be an amalgamation of data from one or more diverse sources, including multiple storage devices or non-physical sources, such as wireless transmissions. As illustrated, electronic data 28 is an abstract depiction of the data on a hard drive, such as may be incorporated as storage element 22, for electronic data storage.

Electronic data 28 of the hard drive is organized in a manner well known in the art, and which is illustrated here. Electronic data 28 is divided into multiple sectors 30, each sector 30 being configured to store at most a predetermined amount of electronic data or information. Historically, a sector 30 is five hundred and twelve (512) bytes of data storage space, though sectors may be smaller and, of late, sectors 30 of considerably larger size have been utilized. A plurality of files 32, denoted by common numerals within various sectors 30, are incorporated in electronic data 28. To the extent that a file 32' can be stored in one sector 30, the file is wholly contained in that sector 30. To the extent that a file 32" is larger than a single sector 30, the file is stored in more than one sector 30. However, in various embodiments, not more than one file 32 may occupy any one sector 30; to the extent that a sector 30 is not wholly consumed with electronic data, the remainder of the sector 30 stays unused. Alternative embodiments may allow for more than one file 32 in a sector 30. Various sectors 30' are unused or unallocated and available for additional files 32 to be written. In alternative embodiments, the location of files is managed, either in supplement to sectors 30 or in alternative to sectors 30, by byte ranges, such that a location of a file 32 is defined in terms of the addresses of the bytes that the file 32 occupies. Thus, in certain such embodiments, a location of file 32 or a fragment of file 32 is defined by a listing of the bytes the file 32 occupies, or as starting at a particular byte and ending at a particular byte within the digital media.

Electronic data 28 is divided into partitions 34, regulated by partition table 36. In various embodiments, electronic data 28 of a hard drive may be accessed by executing a startup program, conventionally known as a "bootloader" program and which is variably located in or incorporates partition table 36. As illustrated, each partition 34 incorporates information indicative of a location of each of the plurality of files, such as file system data 38, for tracking the existence and location of files 32 within corresponding partition 34. In various embodiments, the location of file 32 is a physical location. In an embodiment, file system data 38 is one of files 32. In alternative embodiments, file system data 38, or the information indicative of a physical location of each of the plurality of files generally, not being one of files 32, may be located outside of the structure of the corresponding partition 34, or such information may pertain to more than one partition 34. File system data 38, in various embodiments, incorporates a mapping from the names of files 32 to the location of files 32 data on the hard drive, i.e. which sectors 30 comprise file 32. File system data 38 may also know which sectors 30 in partition 34 are free. File system data 38 may store other fields associated with files 32, such as creation and modification timestamps and security permissions. File system data 38 may be accessed to identify the location of files 32 within a partition 34, including the various sectors 30 in which file 32 is stored.

As illustrated, sectors 30 are given unique identifiers, from sector "0" to sector "95". File 32 "1" of partition 34 "1" may thus be identified as being in sectors 30 "11", "12", "13" and "14". File 32 "4" of partition 34 "2" may be identified as being in sectors "61", "62", "64" and "83", i.e., the file is fragmented. However, because, as noted above, file system data 38 of each partition 34 incorporates the location of each file, the fragmented sector 30 location of file 32 "4" is nevertheless accessible.

In various embodiments, system 10 may identify characteristics of electronic data 28, and in particular, characteristics of files 32 of electronic data 28. In certain embodiments, system 10 is configured to identify the contents of at least one of files 32. For instance, files 32 may be searched for words, images, sounds and other electronic content. Files 32 may be searched for file type, date created, date modified and other information relating to the nature of particular files 32 and their use. However, in contrast to conventional algorithms which incorporate multiple processors, system 10 may analyze all sectors 30 of electronic data 28 and determine characteristics of all of files 32. Alternatively, particular sectors 30, partitions 34 and files 32 may be selected as a sub-part of electronic data 28 for analysis. Nevertheless, all of the selected sub-part may be analyzed for the characteristics of the corresponding files 32. In addition, characteristics may be determined for any constituent parts of electronic data 28, including partition table 36, file system data 38 and data which may have previously been stored in currently unused sectors 30.

Figure 3:
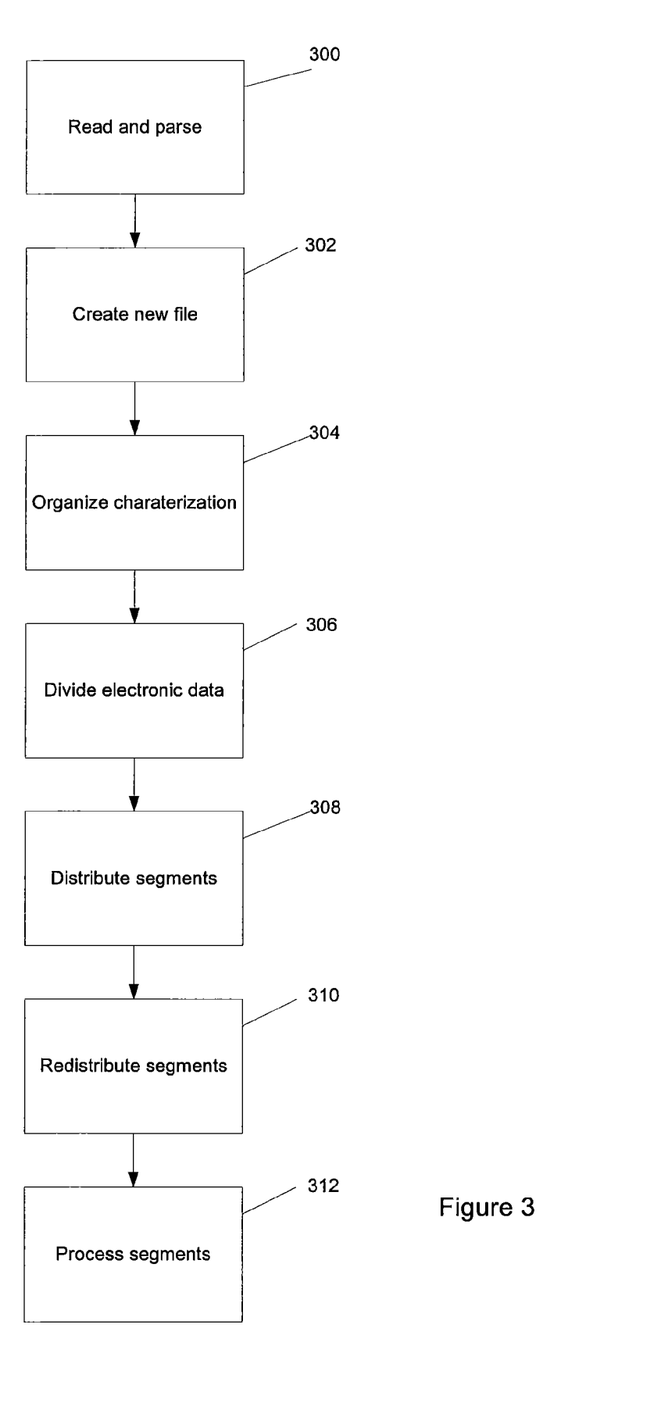
FIG. 3 is a flowchart for determining a characteristic of electronic data.

FIG. 3 is a flowchart for obtaining a characteristic of electronic data 28. As described below, FIG. 3 relates directly to the analysis of hard drive images. However, it will be understood that, with minor modifications, any electronic data may be analyzed according to this flowchart. In various embodiments, electronic data 28 is incorporated on one of storage elements 22 of system 10. In embodiments in which a hard drive is being analyzed, the hard drive itself is simply incorporated as one of storage elements 22 of system 10. Alternatively, the image of the hard drive is transferred to a native one of storage elements 22 of system 10.

Where partition table 36 and file system data 38 are available, partition table 36 and file system data 38 are read and parsed (300) to identify the existence of files 32 and sectors 30 to which individual files 32 correspond. In various embodiments, controller 24 reads and parses partition table 36 and file system data 38. In an embodiment, controller 24 then creates (302) a new file incorporating structured information describing every file 32 in the electronic data 28 or sub-part of electronic data 28, as well as partition table 36, file system data 38, unused sectors 30, and sectors 30 unallocated to particular partitions 34. In various alternative embodiments, the new file incorporates some but not all of the above information.

Steps (300) and (302) together may not, in various embodiments, require more than a few seconds or minutes, owing to the fact that steps (300) and (302) do not account for much of electronic data 28 and their internal structures are designed to be compact and easily read by a program operated by controller 24 with minimal processing. Regardless of the specifics of partition table 36 and file system data 38, the information written to the new file may be in the same format and capable of describing files 32 and their corresponding sectors 30. In this way, system 10 has characterized electronic data 28 while the new file may be identified as a characterization or generic filesystem map of electronic data 28.

In various embodiments, the characterization is then optionally organized (304) by controller 24. The characterization may be organized according to various factors which are discussed below. In an embodiment, the primary factor of organization is the location of sectors 30 corresponding to individual files 32. Alternatively, additional factors may be file name, full paths to files 32, file size, and other criteria known in the art.

On the basis of the characterization, electronic data 28 may be divided (306) into segments 40 (FIG. 2). In an embodiment, the segments 40 account for all of electronic data 28. In the simplified, illustrated embodiment of FIG. 2, electronic data 28 may be divided (306) by column, with all sectors 30 of each column forming a segment 40. In various embodiments, electronic data 28 is divided into as many segments 40 as correspond to the number of processors 12 available to system 10. In various embodiments, where processors 12 are not available or not used for whatever reason, the number of segments 40 created is reduced to correspond to the number of available processors 12. Alternatively, more or fewer segments 40 than available processors 12 may be created, though doing so may underutilize the resources of system 10.

In various embodiments, controller 24 divides (306) at least some of electronic data 28 by uploading electronic data 28 and the characterization to a program known in the art for dividing various forms of electronic data. The division (306) may be based on a work process of electronic data 28 generated by controller 24 or processors 12 generally. One such program is known as a mapreduce-style cluster. In various embodiments, the mapreduce-style cluster divides electronic data 28 sequentially into equally sized segments 40. In an embodiment, all of electronic data 28 is divided.

Controller 24, in various embodiments utilizing the mapreduce-style cluster, then distributes (308) at least some of the segments 40 to processors 12 based on the work process so that each of the at least some segments 40 corresponds to at least one processor 12. In an embodiment, all of the segments 40 are distributed. Where there are equal numbers of processors 12 and segments 40, each processor 12 receives one segment 40 of electronic data 28. In any event, each processor 12 receives at least one segment 40 and each of the segments 40 is distributed to at least one processor. It is to be understood that, to the extent that processor 12 is not utilized to process a segment 40, processor 12 is not deemed to be part of system 10 for the purposes of this method.

Where a given processor 12 corresponds to a local storage element 22, local storage element 22 may store the segment 40 for processor 12. Alternatively, the segment 40 may be stored on system memory corresponding to processor 12 or otherwise cached. Alternatively, network 20 may stream the segment 40 to processor 12 from a storage element 22 or system memory not locally corresponding to processor 12.

In certain embodiments, the characterization is also distributed to each processor 12. In various embodiments, the characterization is distributed in whole to each processor 12. Alternatively, the characterization is distributed only in pertinent part to each processor 12. The pertinent part of the characterization may differ for each processor, and may correspond only to such files 32 as exist, in whole or in part, within the segment 40 distributed to each processor 12.

Following distribution (308), sectors 30 of the segments 40 may be redistributed (310) if particular files 32 within a segment 40 are fragmented. In various embodiments, the processor 12 with the most sectors 30 of a fragmented file 32 keeps fragmented file 32 while the processors 12 having fewer sectors 30 of file 32 transmit those sectors 30 to the majority processor 12. In an exemplary embodiment, if one processor 12 receives a segment 40 having a file 32 with three sectors 30 out of a total of five sectors 30 located within the segment 40, controller 24 may direct the processors 12 corresponding to the segments 40 with the other two sectors 30 of file 32 to transmit those sectors 30 to the processor 12 with the three sectors 30 of file 32. As described here, redistribution (310) may be based on factors other than which processor 12 has the most sectors 30 of a file 32, including, for instance, which processor 12 has the starting sector 30 of a file 32.

Following redistribution (310), processors 12 process (312) their assigned segments 40 in order to identify characteristics of files 32. The output of processing (312), in an embodiment, is the results of a search for keywords, file types, and other characteristics of files 32 which were input into system 10 by a user. Alternatively, the output of processing (312) may be a searchable file for future searches of electronic data 28.

Figure 4:
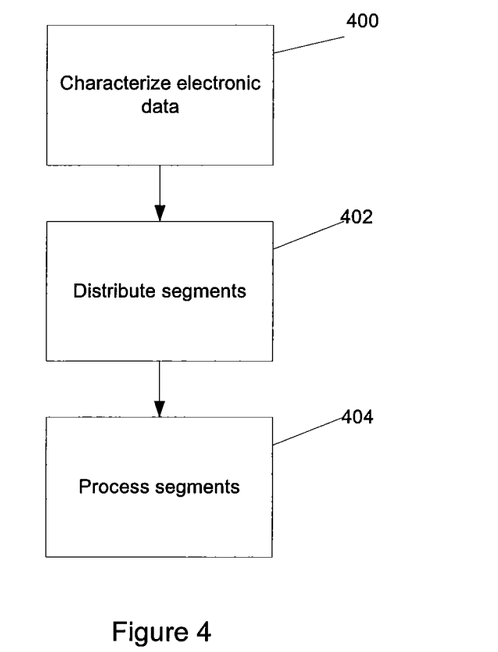
FIG. 4 is a flowchart for determining a characteristic of electronic data.

FIG. 4 is a flowchart of an alternative method to that of FIG. 3, which incorporates some but not all of the steps of FIG. 3. However, related steps may utilize the same specific methodologies. As illustrated, electronic data 28 is characterized (400) in order to obtain a characterization of the contents of electronic data 28. In various embodiments, characterization (400) occurs by incorporating some or all of steps (300) and (302), including by analyzing files 32 and file system data 38.

On the basis of the characterization, electronic data 28 is distributed (402) by controller 24 to various processors 12. The distribution is by segments 40, and the segments 40 are created by controller 24 so that each file 32 is wholly contained within a given segment 40. In comparison with the method of FIG. 3, the effects of redistribution step (310) may be obtained without the additional steps by distributing the segments 40 in the first instance with files 32 organized by files 32. However, in various implementations, particularly those with large amounts of electronic data 28 and large numbers of files 32, it may be more efficient follow the method of FIG. 3 and utilize all of processors 12 to redistribute sectors 30 than to rely on controller 24 by itself.

Following distribution (402), processors 12 process (404) the segments 40 distributed to each processor 12 in order to identify characteristics of files 32. The output of processing (404), in an embodiment, is the results of a search for keywords, file types, and other characteristics of files 32 which were input into system 10 by a user. Alternatively, the output of processing (404) may be a searchable file for future searches of electronic data 28.

It is noted that the details of the method of FIG. 4 may be performed in a manner the same as or similar to that of FIG. 3. For instance, distribution (402) may proceed on the basis of a mapreduce-style cluster or a related program. The processors 12 which constitute system 10 for FIG. 4 may be evaluated in view of the same considerations for what constitute system 10 for the purposes of FIG. 3, while the number of segments 40 distributed to each processor 12 may be the same as in FIG. 3. All of the method steps of FIG. 3 are contemplated as potentially being applied to FIG. 4, either in substation of or in addition to steps of FIG. 4, and vice versa.

What follows is an exemplary application of the methods of FIGS. 3 and 4, utilizing system 10 and electronic data 28 as illustrated in FIG. 2. System 10, for the purposes of this example, comprises twelve (12) processors 12, one of which acts as controller 24, and each of which is coupled to a local storage element 22, though not necessarily on a one-to-one correspondence.

In following the steps of FIG. 3 and FIG. 4, controller 24 characterizes (300), (302) and characterizes (400), respectively, electronic data 28 to obtain a characterization, illustrated in Table 1:

TABLE 1

Characterization of electronic data 28

| Start Sector | Name | Extent Sectors |
| --- | --- | --- |
| 0 | Partition Table | 0-3 |
| 4 | Unused #1 | 4-5 |
| 6 | /Partition 1/file system data | 6-10 |
| 11 | /Partition 1/File 1 | 11-14 |
| 15 | /Partition 1/File 2 | 15-16 |
| 17 | /Partition 1/Unallocated 1 | 17-18 |
| 19 | /Partition 1/File 3 | 19-23 |
| 24 | /Partition 1/File 4 | 24-26 |
| 27 | /Partition 1/File 5 | 27-27 |
| 28 | /Partition 1/Unallocated 2 | 28-39 |
| 40 | Unused #2 | 40-47 |
| 48 | /Partition 2/file system data | 48-51, 64-66 |
| 52 | /Partition 2/File 1 | 52-53 |
| 54 | /Partition 2/File 2 | 54-55 |
| 56 | /Partition 2/File 3 | 56-60 |
| 61 | /Partition 2/File 4 | 61-63, 83-83 |
| 71 | /Partition 2/File 6 | 72-79 |
| 80 | /Partition 2/File 7 | 80-82 |
| 84 | /Partition 2/Unallocated 2 | 84-87 |
| 88 | Unused #3 | 88-95 |

By the steps of FIG. 3, regardless of this characterization, electronic data 28 may be organized (304), divided (306) and distributed (308) according to equally-sized segments 40 based on the number of processors 12, i.e., twelve (12), illustrated in Table 2. The steps of FIG. 4 forego the initial division and distribution of electronic data 28.

TABLE 2

Initial segments

| | |
| --- | --- |
| Processor 1 | Sectors 0-7 |
| Processor 2 | Sectors 8-15 |
| Processor 3 | Sectors 16-23 |
| Processor 4 | Sectors 24-31 |
| Processor 5 | Sectors 32-39 |
| Processor 6 | Sectors 40-47 |
| Processor 7 | Sectors 48-55 |
| Processor 8 | Sectors 56-63 |
| Processor 9 | Sectors 64-71 |
| Processor 10 | Sectors 72-79 |
| Processor 11 | Sectors 80-87 |
| Processor 12 | Sectors 88-95 |

The characterization may be organized (306) according to the first sector 30 of every file 32 and other entity (e.g., file system data 38) in electronic data 28. As noted above, with this characterization, controller 24 may distribute (402) or, in the case the steps of FIG. 3, each processor 12 may optionally decide whether to redistribute (310) for extracting or otherwise determining a characteristic of one or more files 32 based on the starting sector 30. In such an embodiment, segments 40 would be apportioned to processors 12 according to Table 3.

TABLE 3

Distribution/redistribution of segments according to first sector location

| Processor | Files | Total Sectors | Percentage of total sectors |
|---|---|---|---|
| 1 | Partition Table, Unused #1, /Partition 1/file system data | 11 | 11.46% |
| 2 | /Partition 1/File 1, /Partition 1/File 2 | 6 | 6.25% |
| 3 | /Partition 1/Unallocated 1, /Partition 1/File 3 | 7 | 7.29% |
| 4 | /Partition 1/File 4, /Partition 1/File 5, /Partition 1/Unallocated 2 | 16 | 16.67% |
| 5 | — | 0 | 0% |
| 6 | Unused #2 | 8 | 8.33% |
| 7 | /Partition 2/file system data, /Partition 2/File 1, /Partition 2/File 2 | 11 | 11.46% |
| 8 | /Partition 2/File 3, /Partition 2/File 4 | 9 | 9.38% |
| 9 | /Partition 2/File 5, /Partition 2/Unallocated 1 | 5 | 5.21% |
| 10 | /Partition 2/File 6 | 8 | 8.33% |
| 11 | /Partition 2/File 7, /Partition 2/Unallocated 2 | 7 | 7.29% |
| 12 | Unused #3 | 8 | 8.33% |

As can be seen, while providing a relatively straightforward scheme which is comparatively easy to implement, the work may be somewhat unbalanced, providing processor 12 number four with sixteen (16) total sectors 30 to analyze and processor 12 number five with none (0). Thus, alternatively, electronic data 28 may be distributed (402) or redistributed (310) according to which segment 40 initially had the largest number of sectors 30 of each file 32 or other item (e.g., file system data 38), i.e., which segment 40 has each file 32 in primary part, according to Table 4.

TABLE 4

Distribution/redistribution according to largest file size

| Processor | Files | Total Sectors | Percentage of total sectors |
|---|---|---|---|
| 1 | Partition Table, Unused #1, /Partition 1/file system data | 11 | 11.46% |
| 2 | /Partition 1/File 1, /Partition 1/File 2 | 6 | 6.25% |
| 3 | /Partition 1/Unallocated 1, /Partition 1/File 3 | 7 | 7.29% |
| 4 | /Partition 1/File 4, /Partition 1/File 5, | 4 | 4.17% |
| 5 | /Partition 1/Unallocated 2 | 12 | 12.50% |
| 6 | Unused #2 | 8 | 8.33% |
| 7 | /Partition 2/file system data, /Partition 2/File 1, /Partition 2/File 2 | 11 | 11.46% |
| 8 | /Partition 2/File 3, /Partition 2/File 4 | 9 | 9.38% |
| 9 | /Partition 2/File 5, /Partition 2/Unallocated 1 | 5 | 5.21% |
| 10 | /Partition 2/File 6 | 8 | 8.33% |
| 11 | /Partition 2/File 7, /Partition 2/Unallocated 2 | 7 | 7.29% |
| 12 | Unused #3 | 8 | 8.33% |

In this way, while processor 12 number four now has relatively few total sectors, no one processor 12 has far more or far fewer sectors than any other processor 12, though the distribution/redistribution process may be relatively more complicated than the distribution/redistribution scheme of Table 3. As has been discussed above, alternative distribution/redistribution schemes may also be used. In certain embodiments, a distribution/redistribution scheme may be utilized which keeps complete files in each segment 40 but which more evenly conducts the distribution to each processor 12.

Thus, embodiments of the data characterization system and method are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A system for conducting a forensic analysis of electronic data duplicated from an electronic storage device, the electronic data comprising a plurality of files and information indicative of a location of each of the plurality of files in the electronic storage device, the system comprising:
   a controller operatively coupled to a plurality of processors, wherein the controller is configured to:
      characterize the electronic data based, at least in part, on the plurality of files and the information indicative of the location of each of the plurality of files to obtain a characterization; and
      distribute a plurality of segments of the electronic data, at least some of the plurality of segments being approximately equal in size, to the plurality of processors based, at least in part, on the characterization, each of the plurality of processors corresponding to at least one of the plurality of segments and each of the plurality of segments corresponding to at least one of the plurality of processors; and
   wherein each one of the plurality of processors is configured to process each corresponding one of the plurality of segments to identify at least one characteristic of each corresponding one of the plurality of segments, wherein the plurality of processors are configured to process in parallel, and wherein each of the plurality of processors are configured to communicate with at least one other one of the plurality of processors.

2. The system of claim 1, wherein the controller is further configured to create a work process for the plurality of segments of the electronic data based, at least in part, on the characterization; and
   wherein the controller is further configured to distribute the plurality of segments of the electronic data to the plurality of processors based, at least in part, on the work process.

3. The system of claim 1, wherein the plurality of segments account for all of the electronic data.

4. The system of claim 3, wherein the plurality of segments is a distribution plurality of segments;
   wherein the electronic data is initially divided into an initial plurality of segments, each individual one of the initial plurality of segments comprising at least a portion of at least one of said plurality of files;
   wherein the controller is further configured to characterize the electronic data to obtain the characterization by identifying, for at least some of the plurality of files, segments of the initial plurality of segments to which each one of the at least some of the plurality of files corresponds; and
   wherein the controller is further configured to cause the electronic data to be divided into the distribution plurality of segments based, at least in part, on the characterization, at least some of the distribution plurality of segments being of different size than a size of ones of the initial plurality of segments and comprising at least a portion of at least one of the plurality of files.

5. The system of claim 4, wherein the controller is further configured to distribute the second plurality of segments so that each individual one of the plurality of files is wholly contained in at least one of the second plurality of segments.

6. The system of claim 3, wherein the characteristic identified for each corresponding one of the plurality of segments comprises information pertaining to at least one of the plurality of files corresponding to the corresponding one of the plurality of segments.

7. The system of claim 6, wherein the information comprises contents of the at least one of the plurality of files.

8. The system of claim 3, wherein the information indicative of the location of each of the plurality of files is file system data.

9. The system of claim 4, wherein each of the plurality of files has a file start; and
wherein the controller is further configured to cause the electronic data to be divided into the distribution plurality of segments based, at least in part, on a location in one of the initial plurality of segments of each file start of the plurality of files.

10. The system of claim 4, wherein each individual one of the plurality of files has a correspondence in primary part to one of the initial plurality of segments; and wherein the controller is further configured to cause the electronic data to be divided into the distribution plurality of segments based, at least in part, on the correspondence in primary part of each individual one of the plurality of files.

11. A method for conducting a forensic analysis of electronic data from an electronic storage device, the electronic data comprising a plurality of files and information indicative of a location of each of the plurality of files in the electronic storage device, comprising the steps of:
characterizing the electronic data based, at least in part, on the plurality of files and the information indicative of the location of each of the plurality of files to obtain a characterization;
distributing a plurality of segments of the electronic data, at least some of the plurality of segments being approximately equal in size, to the plurality of processors based, at least in part, on the characterization, each of the plurality of processors corresponding to at least one of the plurality of segments and each of the plurality of segments corresponding to at least one of the plurality of processors; and
causing processing with the plurality of processors of each corresponding one of the plurality of segments to identify at least one characteristic of each corresponding one of the plurality of segments, wherein the plurality of processors are configured to process in parallel, and wherein each of the plurality of processors are configured to communicate with at least one other one of the plurality of processors.

12. The method of claim 11, further comprising the steps of:
creating a work process for each of the plurality of segments of the electronic data based, at least in part, on the characterization; and
wherein the distributing step is further configured to distribute the plurality of segments of the electronic data to the plurality of processors based, at least in part, on the work process.

13. The method of claim 11 wherein the dividing steps further comprises dividing all of the electronic data into the plurality of segments.

14. The method of claim 13 wherein the plurality of segments is a distribution plurality of segments, and further comprising the steps of:
initially dividing the electronic data into an initial plurality of segments, each individual one of the initial plurality of segments and comprising at least a portion of at least one of said plurality of files;
characterizing the electronic data to obtain the characterization by identifying, for at least some of the plurality of files, segments of the initial plurality of segments to which each one of the at least some of the plurality of files corresponds; and
causing the electronic data to be divided into the distribution plurality of segments based, at least in part, on the characterization, at least some of the distribution plurality of segments being of different size than a size of ones of the initial plurality of segments and comprising at least a portion of at least one of the plurality of files.

15. The method of claim 14 wherein the distributing step further comprises distributing the electronic data so that each individual one of the plurality of files is wholly contained in at least one of the second plurality of segments.

16. The method of claim 13 wherein the characteristic identified for each corresponding one of the plurality of segments comprises information pertaining to at least one of the plurality of files corresponding to the corresponding one of the plurality of segments.

17. The method of claim 16 wherein the information comprises contents of the at least one of the plurality of files.

18. The method of claim 13 wherein information indicative of a location of each of the plurality of files is file system data.

19. The method of claim 18 wherein each of the plurality of files has a file start; and
wherein the causing the electronic data to be divided step further comprises causing the electronic data to be divided into the distribution plurality of segments based, at least in part, on a location in one of the initial plurality of segments of each file start of the plurality of files.

20. The method of claim 18 wherein each individual one of the plurality of files has a correspondence in primary part to one of the initial plurality of segments; and
wherein the causing the electronic data to be divided step further comprises causing the electronic data to be divided into the distribution plurality of segments based, at least in part, on the correspondence in primary part of each individual one of the plurality of files.

\* \* \* \* \*